(12) United States Patent
Ouchi

(10) Patent No.: US 9,584,690 B2
(45) Date of Patent: Feb. 28, 2017

(54) ILLUMINATING DEVICE AND IMAGE READING DEVICE

(71) Applicant: KYOCERA Document Solutions Inc., Osaka (JP)

(72) Inventor: Kei Ouchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 15/070,388

(22) Filed: Mar. 15, 2016

(65) Prior Publication Data

US 2016/0277623 A1    Sep. 22, 2016

(30) Foreign Application Priority Data

Mar. 18, 2015 (JP) ................................. 2015-055249

(51) Int. Cl.
H04N 1/04 (2006.01)
H04N 1/028 (2006.01)
F21V 8/00 (2006.01)

(52) U.S. Cl.
CPC .......... *H04N 1/02835* (2013.01); *G02B 6/001* (2013.01); *G02B 6/0006* (2013.01)

(58) Field of Classification Search
CPC .... H04N 1/02835; G02B 6/0006; G02B 6/001
USPC ....................... 358/475, 484, 509
See application file for complete search history.

(56) References Cited

U.S. PATENT DOCUMENTS

| | | | | |
|---|---|---|---|---|
| 5,187,595 A | * | 2/1993 | Kitani | H04N 1/0316 358/475 |
| 6,375,335 B1 | | 4/2002 | Tabata et al. | |
| 6,426,807 B1 | * | 7/2002 | Kawai | G02B 6/0001 250/227.11 |
| 6,464,366 B1 | * | 10/2002 | Lin | G02B 6/0033 358/484 |
| 7,206,040 B2 | * | 4/2007 | Kano | G02B 6/0028 349/62 |
| 7,318,665 B2 | * | 1/2008 | Chung | G02B 6/0031 362/600 |
| 8,724,185 B2 | | 5/2014 | Ouchi | |

(Continued)

FOREIGN PATENT DOCUMENTS

JP    H10-241432 A    9/1998
JP    2013-157841 A    8/2013

*Primary Examiner* — Cheukfan Lee
(74) *Attorney, Agent, or Firm* — IP Business Solutions, LLC

(57) ABSTRACT

A light guide includes an incident surface provided at least at an end portion of the light guide in a longitudinal direction, and receiving light from a light source, an output surface constituting a part of an outer peripheral surface, and outputting the light introduced through the incident surface, a reflecting surface extending along the optical axis so as to oppose the output surface, and including a plurality of reflection patterns that reflect the introduced light toward the output surface, and a reflecting plate opposed to a region in the outer peripheral surface other than the incident surface, the output surface, and the reflecting surface, and reflecting the light from the light source. The outer peripheral surface includes a sloped portion formed so as to come closer to the reflecting plate in a direction away from the incident surface in the longitudinal direction.

7 Claims, 15 Drawing Sheets

(56) References Cited

U.S. PATENT DOCUMENTS

| | | | |
|---|---|---|---|
| 8,885,231 B2* | 11/2014 | Tsumekawa | G02B 6/0031 355/1 |
| 2003/0165054 A1* | 9/2003 | Ohizumi | G02B 6/0018 362/603 |
| 2010/0014315 A1* | 1/2010 | Fujimoto | G02B 6/001 362/615 |
| 2010/0225850 A1* | 9/2010 | Hashimoto | G02B 6/002 349/62 |
| 2013/0194641 A1 | 8/2013 | Ouchi | |
| 2014/0140094 A1* | 5/2014 | Miyao | G02B 6/0055 362/609 |
| 2014/0160791 A1* | 6/2014 | Guo | G02B 6/0031 362/609 |
| 2015/0234112 A1* | 8/2015 | Wang | G02B 6/0021 362/606 |

* cited by examiner

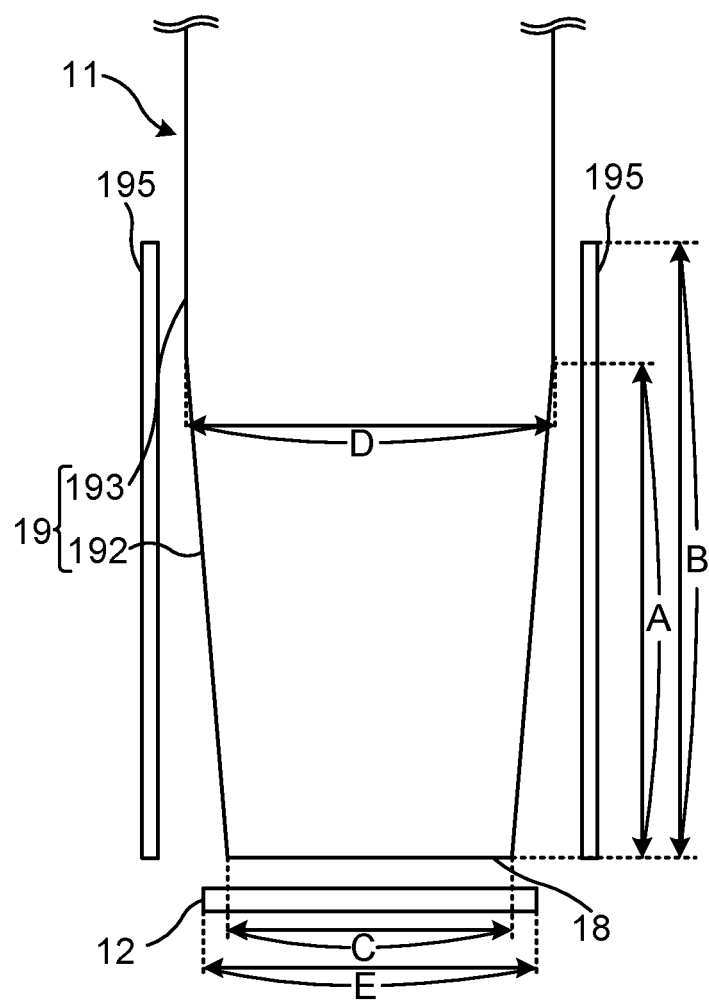

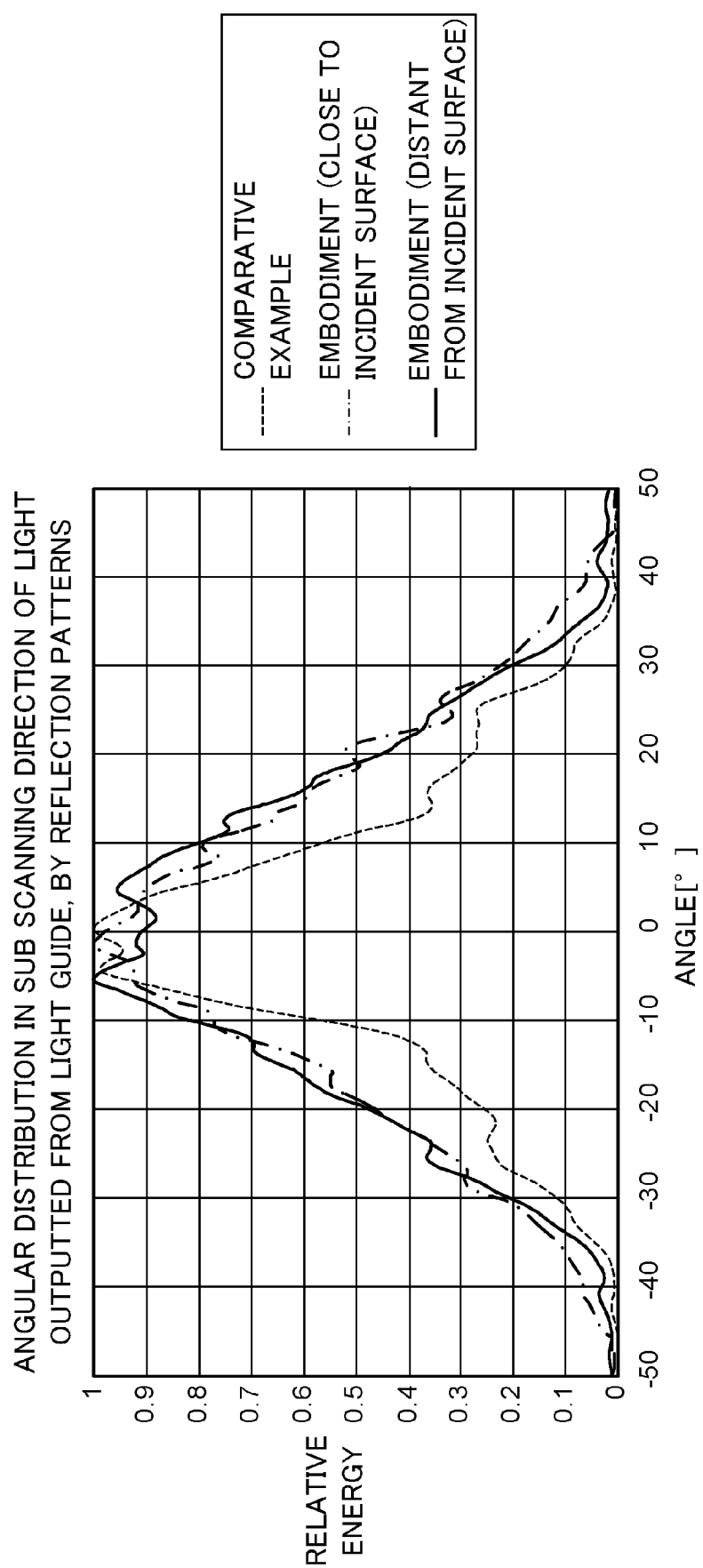

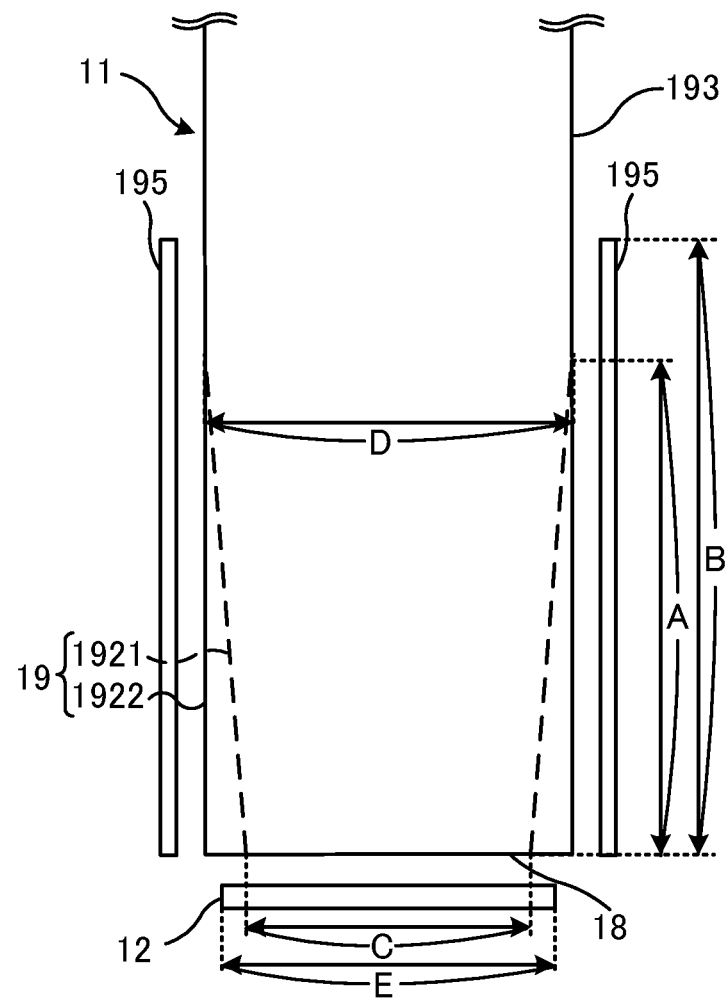

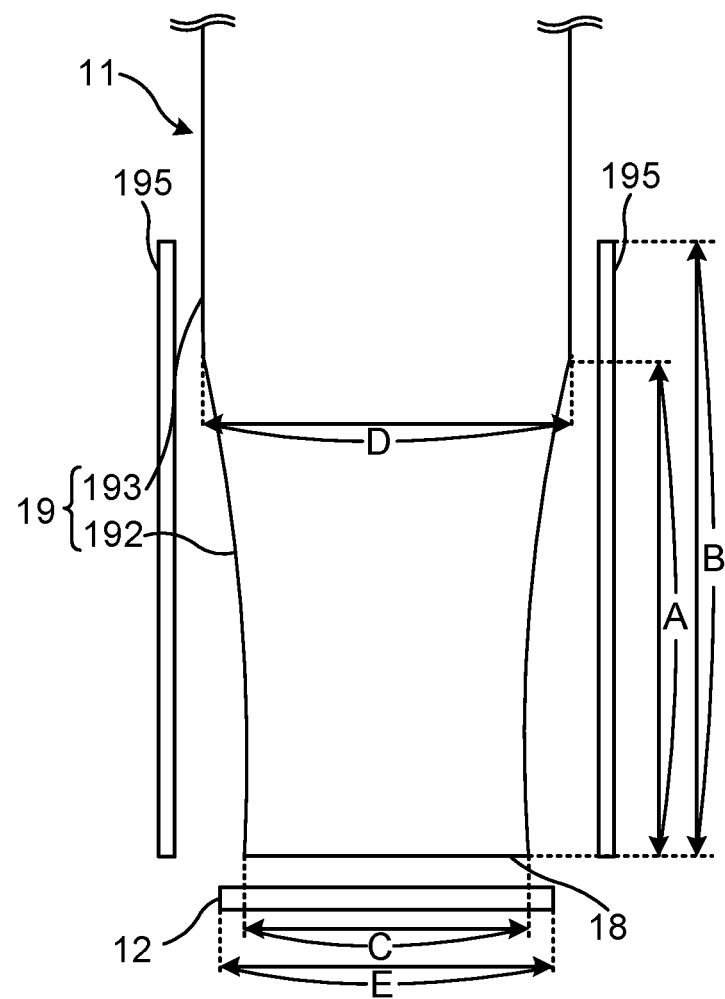

ILLUMINATING DEVICE AND IMAGE READING DEVICE

INCORPORATION BY REFERENCE

This application claims priority to Japanese Patent Application No. 2015-055249 filed on Mar. 18, 2015, the entire disclosure of which are incorporated herein by reference.

BACKGROUND

The present disclosure relates to a light guide, an illuminating device, and an image reading device, and more particularly to a technique of reflecting light introduced into a light guide toward an output surface.

Some of existing image forming apparatuses, for example those incorporated in a multifunction peripheral, employ a linear light source composed of a rod-shaped light guide made of a resin and LEDs that emit light into the light guide through an end portion thereof in a longitudinal direction, as light source unit for an image reading device such as a scanner. The light source unit has to illuminate a document to be read in a linear shape, in synchronization with the reading operation of a line sensor. For such purpose, a light reflecting or scattering pattern is provided on a reflecting surface opposed to an output surface of the light guide from which the light is emitted outward, so as to deflect, with the pattern, the light introduced into the light guide toward the output surface, thereby directing the linear-shaped illuminating light toward the document to be read.

Here, in the case of the combination of the rod-shaped light guide and the LEDs, the illuminating intensity is different between direct light that directly reaches the light reflecting or scattering pattern surface from the LED thus to be deflected, and indirect light totally reflected once or more times by the outer periphery of the light guide and then deflected by the light reflecting or scattering pattern surface. In a region close to the incident surface in the main scanning direction, on which the light from the LED is incident, uniform illuminance is unable to be obtained in the illuminating light emitted from different positions of the light guide and the output surface in the longitudinal direction. Accordingly, an illuminating unit has been known that includes a light guide having a polygonal cross-section instead of circular and formed in a heteromorphic shape in the main scanning direction, so as to restrict the direct light from the LED from reaching the light reflecting or scattering pattern surface.

In addition, an illuminating unit has also been known that includes two prisms having different shapes provided on the reflecting surface, so as to make the illuminance distribution of the direct light and the indirect light uniform.

SUMMARY

Accordingly, the disclosure proposes further improvement of the foregoing technique.

In an aspect, the disclosure provides a light guide formed of a light-transmissive member extending along an optical axis of light introduced into the light guide, the light guide being configured so as to reflect the light introduced into the light guide in a predetermined direction. The light guide includes an incident surface, an output surface, and a reflecting surface.

The incident surface is provided at least at one of end portions of the light guide in a longitudinal direction, and configured to receive light emitted by a light source. The output surface constitutes a part of an outer peripheral surface of the light guide extending along the optical axis of the light introduced through the incident surface, and outputs the light introduced through the incident surface. The reflecting surface extends along the optical axis so as to oppose the output surface, and includes a plurality of reflection patterns that reflect the light introduced through the incident surface, toward the output surface.

The light guide also includes a reflector disposed so as to oppose a region in the outer peripheral surface other than the incident surface, the output surface, and the reflecting surface, and configured to reflect the light emitted by the light source. The outer peripheral surface includes a sloped portion formed so as to come closer to the reflector in a direction away from the incident surface in the longitudinal direction.

In another aspect, the disclosure provides an illuminating device including the foregoing light guide, and the light source opposed to the incident surface so as to emit light into the light guide through the incident surface in the longitudinal direction of the light guide, and emit light to the reflector.

In still another aspect, the disclosure provides an image reading device including the foregoing illuminating device, and a photodetector that receives light reflected by a source document illuminated by the light emitted through the output surface of the light guide.

BRIEF DESCRIPTION OF THE DRAWINGS

FIG. 7A, FIG. 7B, and FIG. 7C are a perspective view, a front view, and a plan view respectively, showing the light guide and reflecting plates according to the embodiment of the disclosure;

FIG. 10 is a graph showing dispersal of reflected light in the sub scanning direction, created by the embodiment and comparative examples;

FIG. 11A, FIG. 11B, and FIG. 11C are a perspective view, a front view, and a plan view respectively, showing a light guide and reflecting plates according to a first comparative example; and FIG. 12A, FIG. 12B, and FIG. 12C are a perspective view, a front view, and a plan view respectively, showing a light guide and reflecting plates according to a second comparative example.

DETAILED DESCRIPTION

Hereafter, a light guide according to an embodiment of the disclosure, and an illuminating device including the light guide will be described with reference to the drawings.

Embodiment

Figure 1:
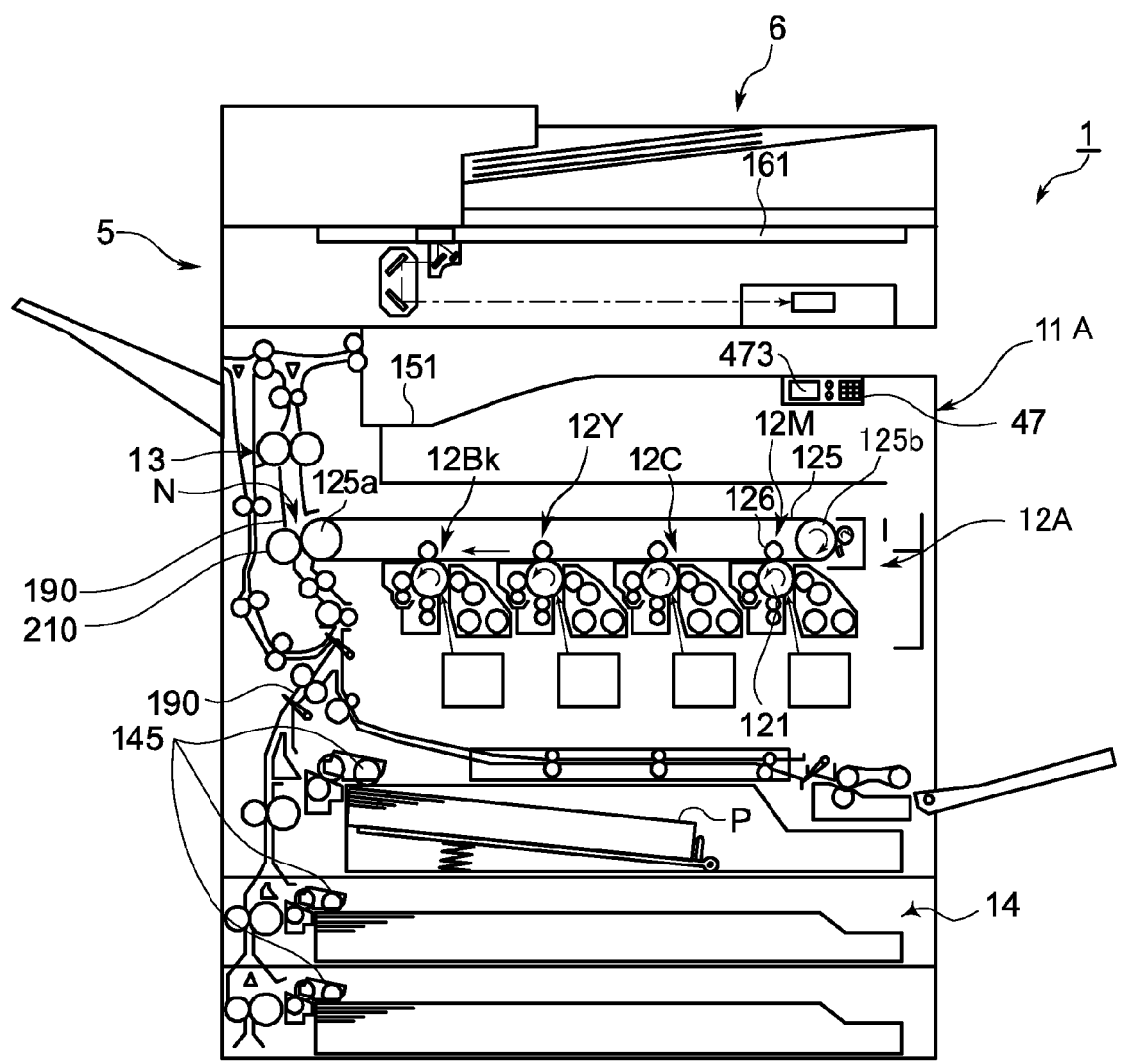
FIG. 1 is a front cross-sectional view showing a configuration of an image forming apparatus including an illuminating device according to an embodiment of the disclosure, mounted in an image reading device.

FIG. 1 is a front cross-sectional view showing a configuration of an image forming apparatus including the illuminating device according to an embodiment of the disclosure, mounted in an image reading device.

The image forming apparatus 1 according to the embodiment of the disclosure is a multifunction peripheral having a plurality of functions, such as copying, printing, scanning, and facsimile transmission. The image forming apparatus 1 includes an operation unit 47, an image forming unit 12, a fixing unit 13, a paper feed unit 14, a document feeder 6, and an image reading device 5, which are mounted inside a main body 11A.

The operation unit 47 receives instructions from the user, for operations and processes that the image forming apparatus 1 is configured to perform, such as image forming and document reading. The operation unit 47 includes a display unit 473 for displaying a guidance and so forth to the operator.

When the image forming apparatus 1 performs the document reading operation, the image reading device 5 optically reads the image on a source document delivered from the document feeder 6 or placed on a contact glass (platen glass) 161, and generates image data. The image data generated by the image reading device 5 is stored in a built-in HDD or a computer connected to a network.

When the image forming apparatus 1 performs the image forming operation, the image forming unit 12A forms a toner image on a recording sheet P serving as a recording medium and delivered from the paper feed unit 14, on the basis of the image data generated through the document reading operation, received from the computer connected to the network or a user terminal device such as a smartphone, or stored in the built-in HDD. Image forming subunits 12M, 12C, 12Y, and 12Bk of the image forming unit 12A each include a photoconductor drum, a developing device that supplies toner to the photoconductor drum, a non-illustrated toner cartridge for storing the toner, a charging device, an exposure device, and a primary transfer roller 126.

In the case of color printing, the image forming subunit 12M for magenta, the image forming subunit 12C for cyan, the image forming subunit 12Y for yellow, and the image forming subunit 12Bk for black in the image forming unit 12A form a toner image based on the corresponding color component, on photoconductor drums 121 through charging, exposing, and developing processes, and the toner image is transferred onto an intermediate transfer belt 125 spanned around a drive roller 125a and a slave roller 125b, via the primary transfer roller 126.

The intermediate transfer belt 125 includes an image carrying surface formed on the outer circumferential surface, onto which the toner image is transferred, and is driven by the drive roller 125a, in contact with the circumferential surface of the photoconductor drum 121. The intermediate transfer belt 125 endlessly runs between the drive roller 125a and the slave roller 125b, in synchronization with the photoconductor drum 121.

The toner images of the respective colors are superposed at an adjusted timing when transferred onto the intermediate transfer belt 125, so as to form a colored toner image. A secondary transfer roller 210 transfers the colored toner image formed on the surface of the intermediate transfer belt 125 onto the recording sheet P transported along a transport route 190 from the paper feed unit 14, at a nip region N of a drive roller 125a engaged with the intermediate transfer belt 125. Then the fixing unit 13 fixes the toner image on the recording sheet P by thermal pressing. The recording sheet P having the colored image formed and fixed thereon is discharged to an output tray 151.

The paper feed unit 14 includes a plurality of paper feed cassettes. A non-illustrated controller rotates a pickup roller 145 of one of the paper feed cassettes in which the sheets of the size designated by the operator are placed, to thereby transport the recording sheet P in the paper feed cassette toward the nip region N.

Figure 2:
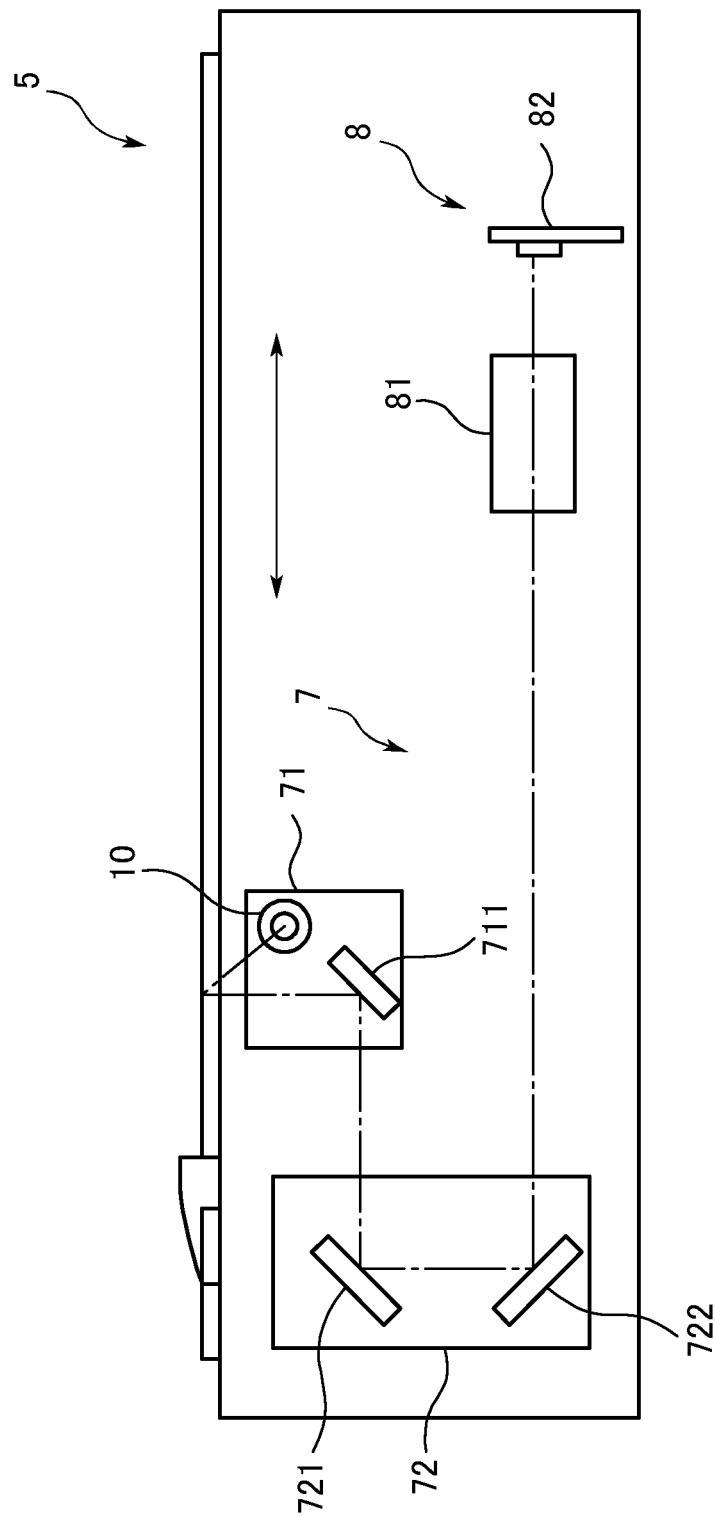
FIG. 2 is a schematic side view showing an internal structure of the image reading device according to the embodiment of the disclosure.

A configuration of the image reading device will now be described. FIG. 2 is a schematic side view showing an internal structure of the image reading device 5.

As shown in FIG. 2, the image reading device 5 includes an optical scanning unit 7 and an image pickup unit 8.

The optical scanning unit 7 includes a first optical system 71 and a second optical system 72.

The first optical system 71 includes an illuminating device 10 and a first mirror 711. The illuminating device 10 is located under the contact glass 161 opposite thereto, so as to emit light toward the surface of the document to be read, in other words upward. The illuminating device 10 includes a rod-shaped light guide and a light source provided at an end portion of the light guide in the longitudinal direction (further details will be subsequently described). The illuminating device 10 extends in the depth direction in FIG. 2, which corresponds to the main scanning direction in the document reading operation.

The first mirror 711 receives the light emitted by the illuminating device 10 to the surface of the document to be read placed on the contact glass 161 and reflected by the document surface, and reflects such light in the horizontal direction. The first mirror 711 is located under the contact glass 161. The illuminating device 10 and the first mirror 711 are mounted on a non-illustrated support member.

The second optical system 72 includes a second mirror 721 and a third mirror 722. The second mirror 721 reflects downward the light reflected by the first mirror 711 of the first optical system 71, in a generally vertical direction. The third mirror 722 further reflects the light reflected by the second mirror 721 in a generally horizontal direction, so as to lead the light toward the image pickup unit 8. The second mirror 721 and the third mirror 722 are mounted on the non-illustrated support member.

The illuminating device 10 and the mentioned mirrors provided in the first optical system 71 and the second optical system 72 have an elongate shape extending in the main scanning direction, in generally the same length as that of the contact glass 161.

Inside the image reading device 5, a non-illustrated rail is provided so as to guide the movement of the optical scanning unit 7 in a direction indicated by an arrow in FIG. 2. Accordingly, the optical scanning unit 7 including the first optical system 71 and the second optical system 72 is configured so as to reciprocate parallel to the contact glass 161 in a sub scanning direction (orthogonal to the main scanning direction, i.e., the direction indicated by the arrow in FIG. 2), to thereby read the image information of the entire surface of the document placed on the contact glass 161.

The image pickup unit 8 is fixed at a lower position inside the image reading device 5. The image pickup unit 8 includes an image forming lens 81 which is an optical member, and a line sensor 82 which is an image sensor. The light reflected by the document surface, and the third mirror 722 of the second optical system 72 enters the image forming lens 81. The image forming lens 81 forms an image based on the reflected light, on the surface of the line sensor 82 located downstream of the optical path. The line sensor 82 generates a voltage proportional to the amount of the received light, in other words serves as photodetector that converts the light information into electrical signals and outputs the signals to a non-illustrated control unit. The line sensor 82 thus reads the image of the document to be read by the image reading device 5.

Figure 3:
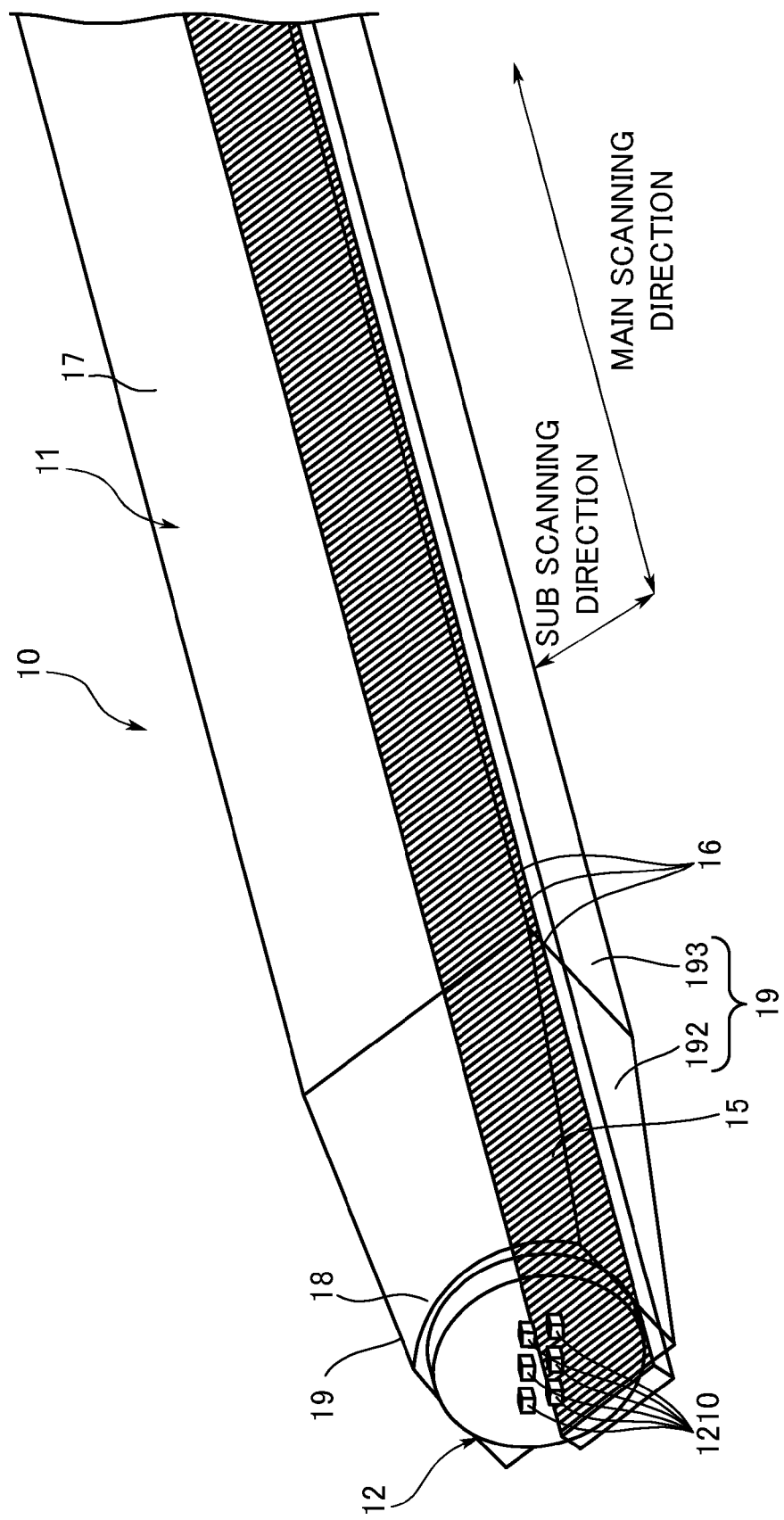
FIG. 3 is a perspective view showing an internal structure of the illuminating device according to the embodiment of the disclosure.

Hereunder, the illuminating device 10 provided in the image reading device 5 will be described. FIG. 3 is a perspective view showing an internal structure of the illuminating device 10.

The illuminating device 10 includes a light guide 11 and a light source 12.

The light guide 11 extends along the optical axis of the light emitted by the light source 12 and entering the light guide 11. Since the light guide 11 extends in the main scanning direction as stated above, the direction of the optical axis and the main scanning direction agree with each other. The light guide 11 is formed of a light-transmissive member, for example made of a resin, and serves to reflect the light from the light source 12 in a predetermined direction (toward an output surface 17), with a reflecting surface 15.

The light guide 11 includes an incident surface 18, the output surface 17, the reflecting surface 15, and a side face 19.

At least one of end faces of the light guide 11 in the longitudinal direction serves as incident surface 18. In this embodiment, only one of the end faces is utilized as incident surface 18. The light source 12 is attached to the incident surface 18. Thus, the light emitted by the light source 12 enters into the light guide 11 through the incident surface 18.

The output surface 17 extends in the main scanning direction, and constitutes one of outer surfaces of the light guide 11. In this embodiment, the output surface 17 corresponds the top surface of the light guide 11. The light introduced into the light guide 11 through the incident surface 18 is reflected by the reflecting surface 15, and emitted to outside the light guide 11 through the output surface 17.

The reflecting surface 15 extends in the main scanning direction, so as to oppose the output surface 17. In this embodiment, the reflecting surface 15 corresponds to the bottom face of the light guide 11. The reflecting surface 15 includes a plurality of reflection patterns 16 formed so as to reflect the light introduced into the light guide 11 toward the output surface 17. The reflecting surface 15 reflects the light introduced into the light guide 11 through the incident surface 18 toward the output surface 17, with the reflection patterns 16. The reflection patterns 16 are formed integrally with the light guide 11, from the same material.

The side face 19 corresponds to a region of the outer peripheral surface of the light guide 11 other than the incident surface 18, the output surface 17, and the reflecting surface 15. The side face 19 corresponds to a lateral face of the light guide 11 when the light guide 11 is viewed from above with the reflecting surface 15 oriented downward.

The light source 12 includes, for example, a plurality of LEDs 1210. The light source 12 is attached to the outer side of the incident surface 18 of the light guide 11. In this embodiment, six LEDs 1210 are provided as light source 12. The direction in which the light source 12 emits the light into the light guide 11 through the incident surface 18 (optical axis direction) corresponds to the longitudinal direction of the light guide 11, in other words main scanning direction.

Figure 4:
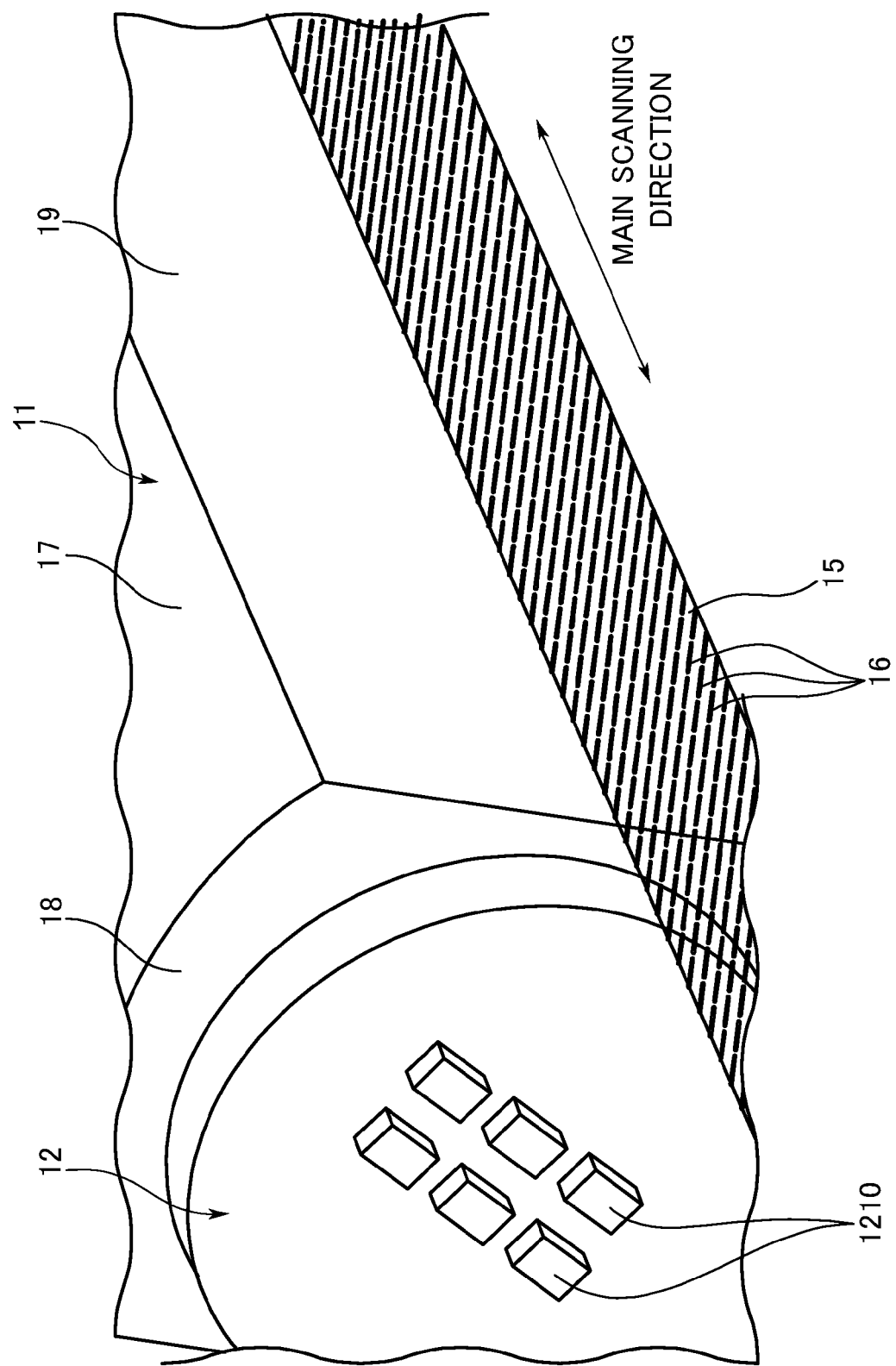
FIG. 4 is an enlarged fragmentary perspective view showing a reflection pattern formed on a reflecting surface inside the light guide according to the embodiment of the disclosure.

The reflection pattern 16 will be described hereunder. FIG. 4 is an enlarged fragmentary perspective view showing the reflection patterns 16 formed on the reflecting surface 15 inside the light guide 11.

The reflection patterns 16 includes morphological patterns that reflect and scatter light incident thereon. The plurality of reflection patterns 16 are aligned in a row in the sub scanning direction on the reflecting surface 15, and a plurality of rows of the reflection patterns 16 are aligned in the main scanning direction. The rows of the reflection patterns 16 are formed in a region between the position on the reflecting surface 15 corresponding to the incident surface 18 and the end portion opposite to the incident surface 18, in the main scanning direction.

The light introduced into the light guide 11 through the incident surface 18 is totally reflected by the outer peripheral surface of the light guide 11 and proceeds in the main scanning direction, thus to reach the end portion opposite to the incident surface 18, in the case where the light reflecting or scattering patterns are not provided in the light guide 11. In such a case, the light from the light source 12 attached to the incident surface 18 is unable to sufficiently illuminate the document to be read, and therefore the reflection patterns 16 are provided on the reflecting surface 15 opposing the output surface 17, so as to reflect the light toward the output surface 17 as well as in the sub scanning direction.

Figure 5:
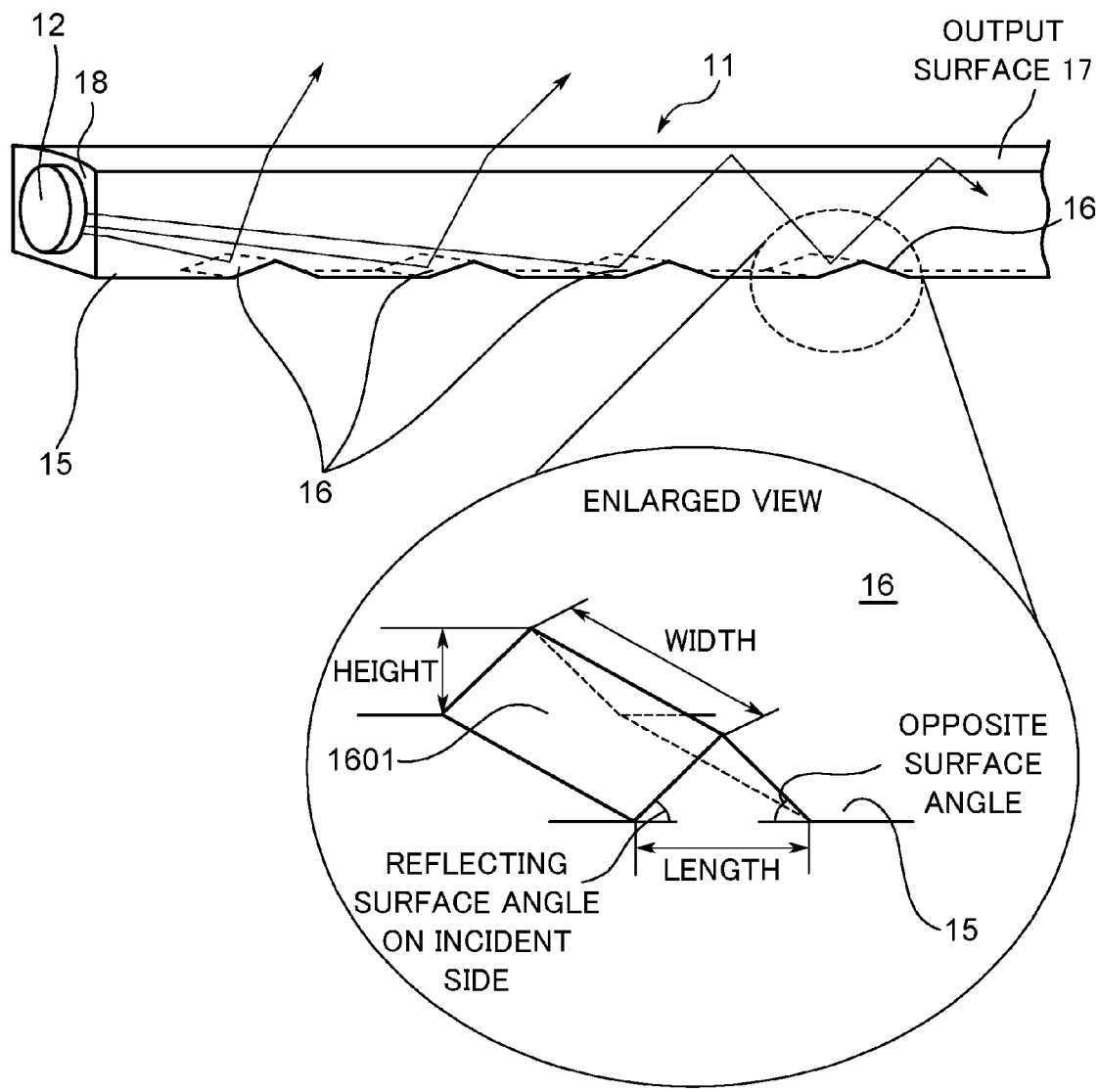
FIG. 5 is a perspective view including a fragmentary enlarged view, showing the reflection pattern formed on the reflecting surface according to the embodiment of the disclosure.
Figure 6:
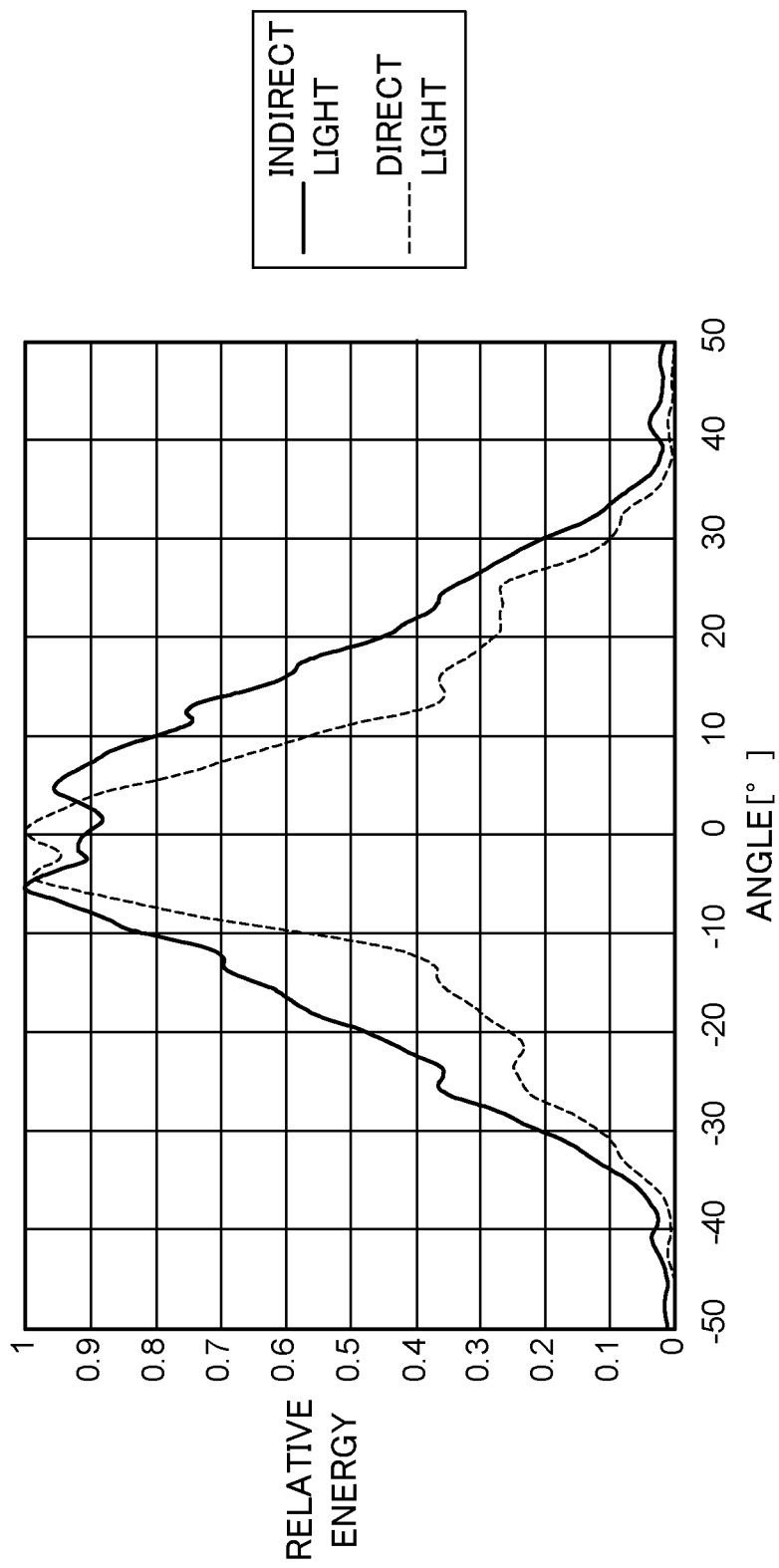
FIG. 6 is a graph showing dispersal of reflected light in a sub scanning direction, created by the reflection pattern according to the embodiment of the disclosure.

Here, description will be given about the scattering of light in the sub scanning direction in a conventional light guide, which takes place when light introduced through the incident surface is reflected by the reflecting surface and emitted through the output surface. FIG. 5 is a perspective view including a fragmentary enlarged view, showing the reflection pattern in the light guide 11. FIG. 6 is a graph showing the dispersal of the reflected light in the sub scanning direction, created by the reflection patterns 16.

The light guide 11 has thus far been known that includes, as shown in FIG. 5, the reflection pattern 16 constituted of a reverse V-shaped prism projecting toward the output surface 17, formed on the reflecting surface 15. The reflection pattern 16 is formed integrally with the light guide 11, from the same material. With the light guide 11 thus configured, the amount of light reflected by a reflection pattern surface 1601 of the reflection pattern 16 toward the output surface 17 can be adjusted, by varying the pitch between the reflection patterns 16 in the main scanning direction, and the height and width of each reflection pattern 16. Therefore, the illuminating light emitted from different positions in the main scanning direction can be made uniform, by adjusting the pitch, height, and width of each of the reflection patterns 16 located on the different positions in the main scanning direction.

However, the light source 12 including the LEDs emits light to the entire circumference of the light guide 11. Accordingly, direct light that directly reaches the reflection pattern surface 1601 from the light source 12, and indirect light incident on the reflection pattern surface 1601 after being totally reflected once or more times by the outer peripheral surface of the light guide 11, are generated. Such direct light and indirect light are different in incident angle with respect to the reflection pattern surface 1601 in the sub scanning direction. Since the direct light is directly incident on the reflection pattern surface 1601 from the LED, the angle with respect to the reflection pattern surface 1601 is shallow and hence the angular distribution of the light emitted through the output surface 17 becomes narrow. In contrast, the indirect light is incident on the reflection pattern surface 1601 by total reflection from the entire circumference of the outer peripheral surface of the light guide 11. Here, the reflection pattern surface 1601 of the reverse V-shaped prism does not possess a deflecting component, and reflects the light at the angle same as the incident angle, in the sub scanning direction. Therefore, as shown in FIG. 6, the light angle distribution after the emission through the output surface 17 in the sub scanning direction is different between the direct light and the indirect light, depending on the incident angle of the direct light and the indirect light with respect to the reflection pattern surface 1601.

Inside the light guide 11, the ratio between the direct light and the indirect light is different depending on the position in the main scanning direction. In particular, the ratio of the indirect light is significantly lower than the ratio of the direct light in a region in the light guide 11 close to the incident surface 18. Accordingly, the illumination distribution in the sub scanning direction largely differs between the region close to the incident surface 18 and a region distant therefrom, in the light guide 11. Thus, the illumination distribution of the light outputted from the light guide 11 in the sub scanning direction differs depending on the position in the main scanning direction.

Accordingly, when the document reading position is shifted in the reading operation, or when the document floats from the surface of the contact glass 161, the reading position is shifted in the sub scanning direction, and therefore the deviation from reference data determined through shading in the main scanning direction becomes uneven over the entire range in the main scanning direction, which may provoke uneven reading density of the image in the main scanning direction, when the reading operation is performed.

Figure 7A:
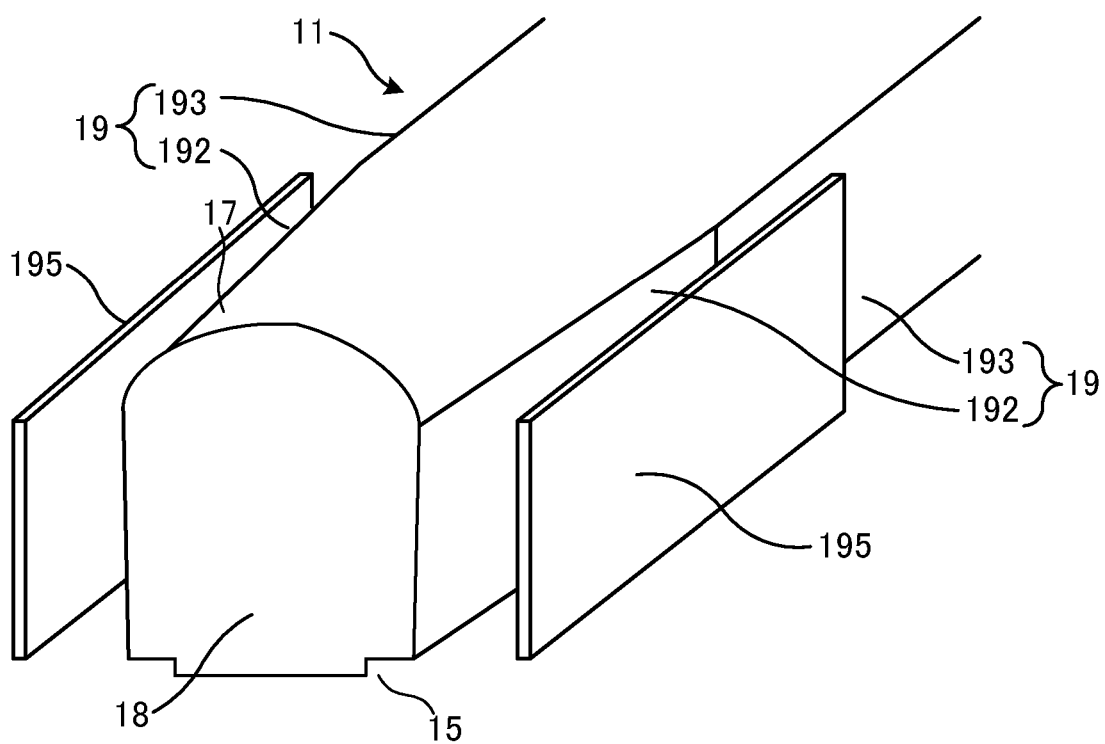
Figure 7B:
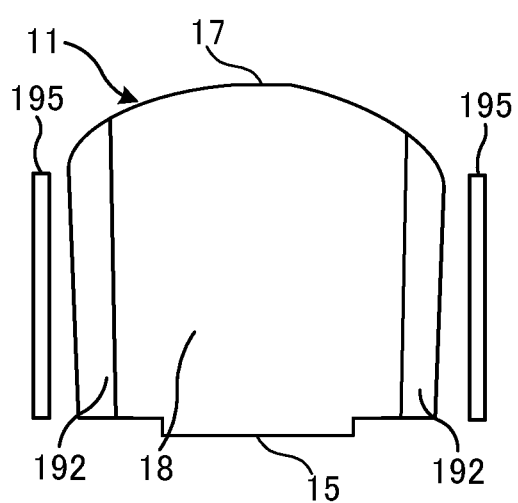

The light guide 11 according to this embodiment includes reflecting plates 195 opposed to the respective side faces 19 as shown in FIG. 7A to FIG. 7C, to secure uniformity in angular distribution of the illuminating light in the sub scanning direction, at different positions in the main scanning direction. In addition, the light guide 11 according to this embodiment includes a sloped portion formed so as to come closer to the reflecting plate (reflector) 195 in a direction away from the incident surface 18 in the longitudinal direction of the light guide 11. Accordingly, a part of the light emitted by the light source 12 is directed to the side faces of the light guide 11 instead of passing through the incident surface 18. The light directed to the side faces of the light guide 11 instead of passing through the incident surface 18 is reflected by the reflecting plate 195 and then enters into the light guide 11.

FIG. 7A to FIG. 7C illustrate the light guide 11 and the reflecting plates 195, FIG. 7A being a perspective view, FIG. 7B being a front view on the side of the incident surface 18, and FIG. 7C being a plan view on the side of the output surface 17.

As shown in FIG. 7A to FIG. 7C, a region 192 in the side face 19 of the light guide 11 close to the incident surface 18, in other words the region 192 located within a predetermined distance A from the incident surface 18 in the longitudinal direction of the light guide 11 is sloped so as to come closer to the reflecting plate 195 (farther from the optical axis) in the direction away from the incident surface 18. In addition, a region 193 distant from the incident surface 18 beyond the predetermined distance A in the longitudinal direction of the light guide 11 is parallel to the reflecting plate 195. Therefore, a width C of the incident surface 18 in the sub scanning direction is narrower than a width D in the sub scanning direction at a position corresponding to the predetermined distance A from the incident surface 18 of the light guide 11 along the optical axis.

Figure 8:
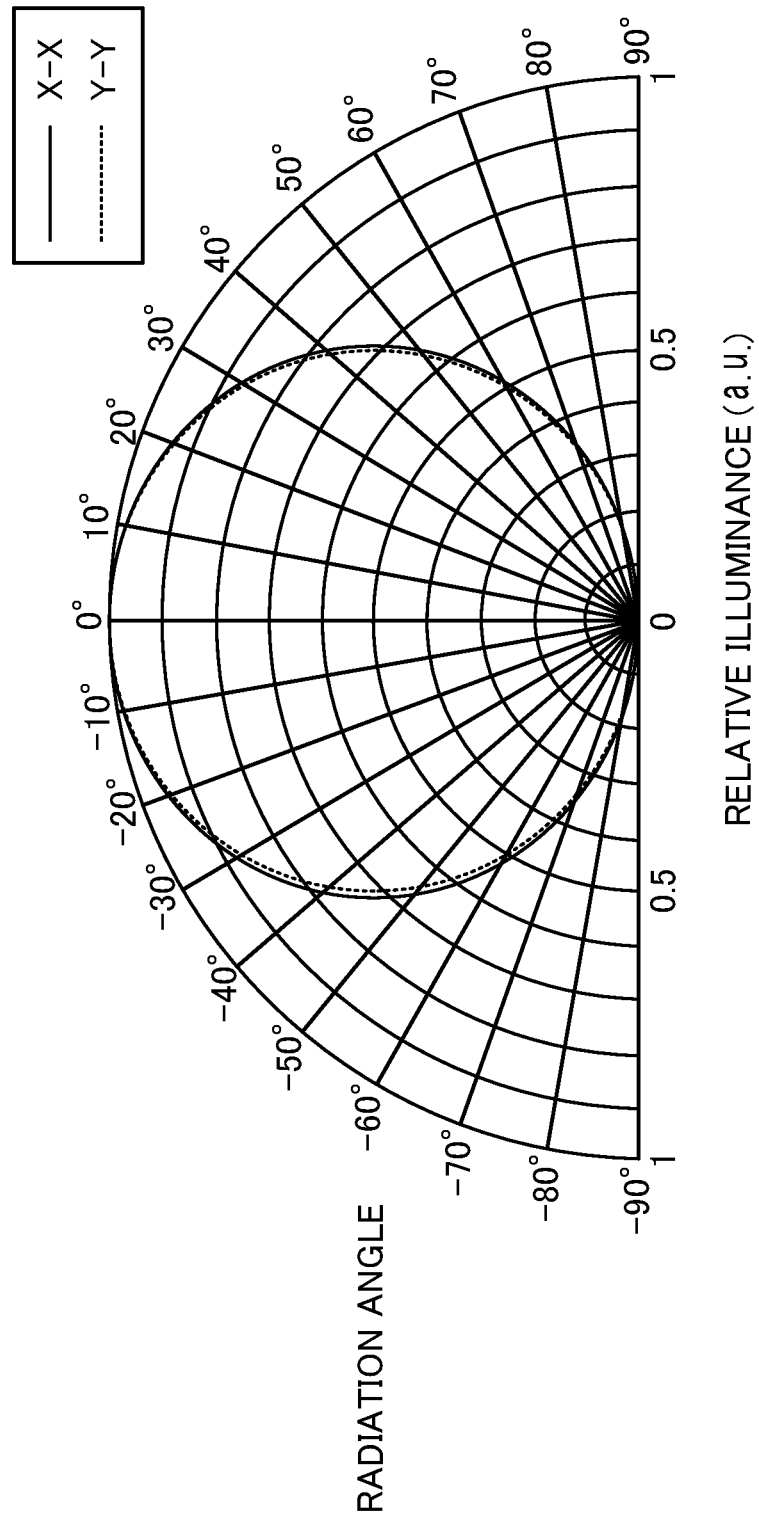
FIG. 8 is a diagram showing an example of light distribution angle of a light source according to the embodiment of the disclosure.
Figure 9:
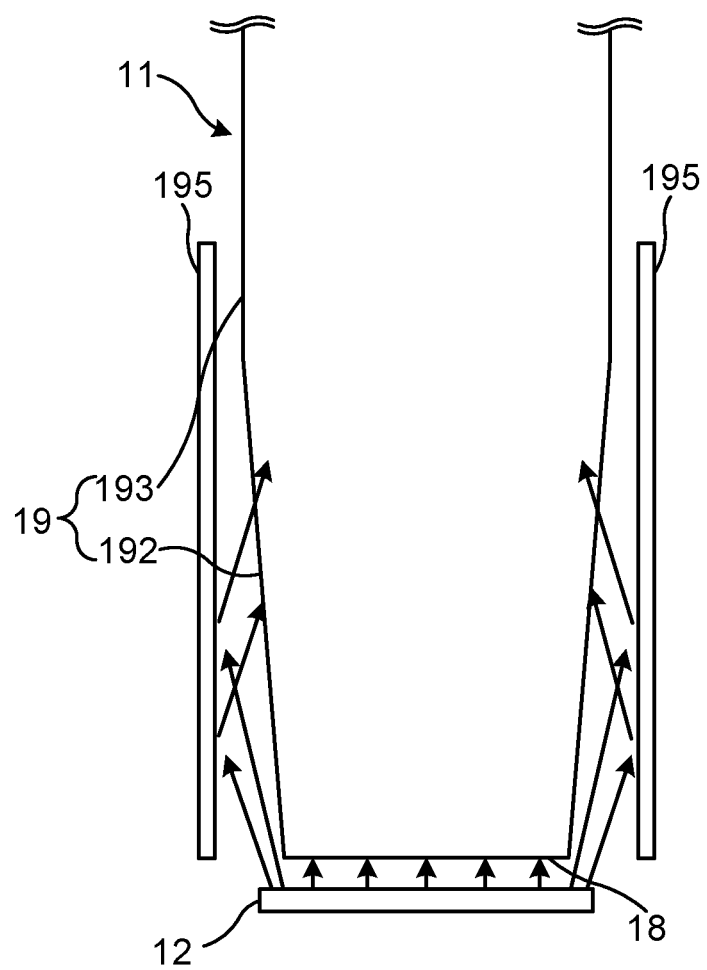
FIG. 9 is a schematic plan view showing an optical path of light emitted from the light source according to the embodiment of the disclosure.

Here, it is preferable that the light source 12 provides a wide light distribution angle as shown in FIG. 8. In addition, it is preferable that a width E of the light source 12 in the sub scanning direction is wider than the width C of the incident surface 18 in the sub scanning direction, as shown in FIG. 7C. Such a configuration allows a part of the light emitted by the light source 12 to be directed to the side face of the light guide 11, instead of passing through the incident surface 18, as shown in FIG. 9.

Further, as shown in FIG. 7A to FIG. 7C, the reflecting plates 195 are provided so as to oppose the respective side faces 19 of the light guide 11 in the region close to the incident surface 18, more specifically over a predetermined distance B from the incident surface 18 in the longitudinal direction of the light guide 11. The predetermined distance B is longer than or equal to the predetermined distance A (B≥A), in other words the reflecting plate 195 is provided at least over a range corresponding to the region 192 of the side face 19.

The reflecting plate 195 is formed of a material having high optical reflectance, for example a white resin or a metal such as aluminum. As shown in FIG. 9, the light directed to the side face of the light guide 11 instead of passing through the incident surface 18 is reflected by the reflecting plate 195. The light reflected by the reflecting plate 195 is directed to the side face 19 of the light guide 11 and enters thereinto through the side face 19. The light introduced into the light guide 11 by being reflected by the reflecting plate 195 is incident on the reflection pattern surface 1601 as a part of the indirect light, thereby increasing the ratio of the indirect light. In the light guide 11 according to this embodiment, the region 192 of the side face 19 close to the incident surface 18, where the ratio of the indirect light is significantly lower than that of the direct light, is sloped, and also the reflecting plate 195 is provided in the region close to the incident surface 18. Therefore, the ratio of the indirect light in the region in the light guide 11 close to the incident surface 18 can be increased to a level close to the ratio of the indirect light in the remaining region. Consequently, the light distribution of the light guide 11 over different positions in the main scanning direction can be leveled off with a minimum necessary size in the main scanning direction, and thus uneven illumination can be suppressed.

Here, with the illumination system that only depends on the indirect light, such as the one having a linear light source composed of a rod-shaped light guide made of a resin and LEDs that emit light into the light guide through an end portion thereof in the longitudinal direction, the light introduced into the light guide has to be totally reflected by the outer periphery of the light guide, and hence the illuminating light can barely be obtained in the region close to the incident surface of the light from the LED. Therefore, a certain distance has to be secured from the incident surface of the light from the LED in order to obtain the necessary illuminating light, and the light guide has to be made longer compared with the size of the document to be read, which impedes the reduction in size of the apparatus.

Further, in the case of the illuminating unit including two prisms having different shapes provided on the reflecting surface, so as to make the illuminance distribution of the direct light and the indirect light uniform, the shape of each prism has to be formed with high accuracy and hence a precision bite has to be employed for each of the prisms, which leads to an increase in manufacturing cost. In addition, in case that the two prisms fail to be manufactured without the required accuracy in a size different from the design, the expected reflected light amount is unable to be secured and the illumination becomes uneven in the main scanning direction.

However, with the light guide according to the disclosure, the uniformity in angular distribution of the illuminating light in the sub scanning direction can be secured at different positions in the main scanning direction, with a minimum necessary size.

FIG. 10 is a graph showing dispersal of the reflected light in the sub scanning direction, created by this embodiment and comparative examples. The comparative example represents the dispersal of the reflected light in the region close to the incident surface 18, in a light guide formed parallel to the optical axis without the sloped portion in the side face 19, and not accompanied with the reflecting plates 195. In view of FIG. 10, it is apparent that the dispersal of the reflected light in the region close to the incident surface 18 according to this embodiment exhibits a wider angular distribution compared with the dispersal of the comparative example. It can therefore be construed that the dispersal of the reflected light in the region close to the incident surface 18 according to this embodiment is close to the dispersal of the reflected light in the region distant from the incident surface 18 according to this embodiment.

The disclosure may be modified in various manners without limitation to the configuration according to the foregoing embodiment. In addition, the configuration according to the foregoing embodiment and the following variations may be partially combined.

<Variation 1>

Figure 11A:
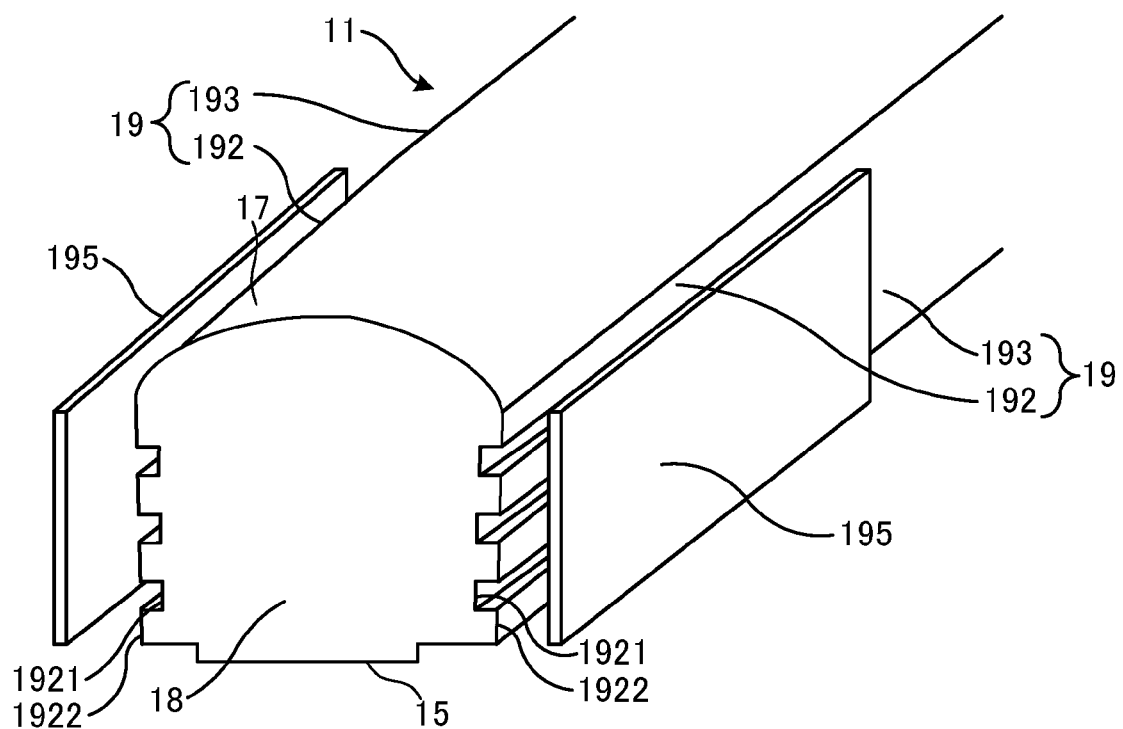
Figure 11B:
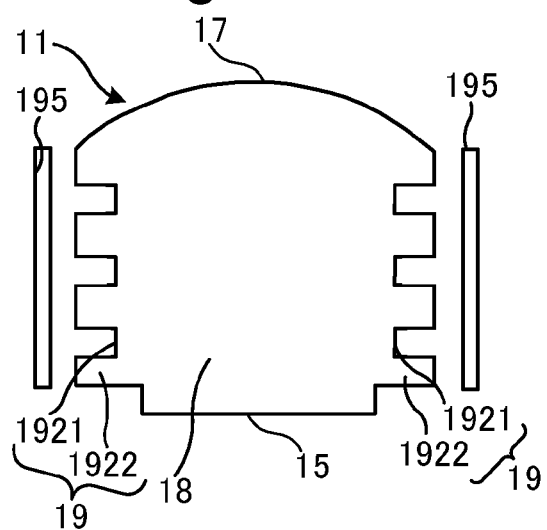

FIG. 11A to FIG. 11C illustrate the light guide 11 and the reflecting plates 195 according to a variation 1, FIG. 11A being a perspective view, FIG. 11B being a front view on the side of the incident surface 18, and FIG. 11C being a plan view on the side of the output surface 17.

In the light guide 11 according to the variation 1, only a partial region 1921 in the region 192 in the side face 19 of the light guide 11, not the whole of the region 192, is sloped, and the remaining region 1922 in the region 192 is parallel to the optical axis. In other words, the sloped portion is formed in a part of the side face 19 so as to recede inwardly of the light guide 11.

FIG. 11A to FIG. 11C represent the case where three recessed regions 1921 are formed on each side, totally six on both sides. The amount of the light directed to the side face of the light guide 11 instead of passing through the incident surface 18 can be adjusted, by changing the ratio in area of the region 1921 to the region 192 of the side face 19, or the number of the regions 1921.

<Variation 2>

Figure 12A:
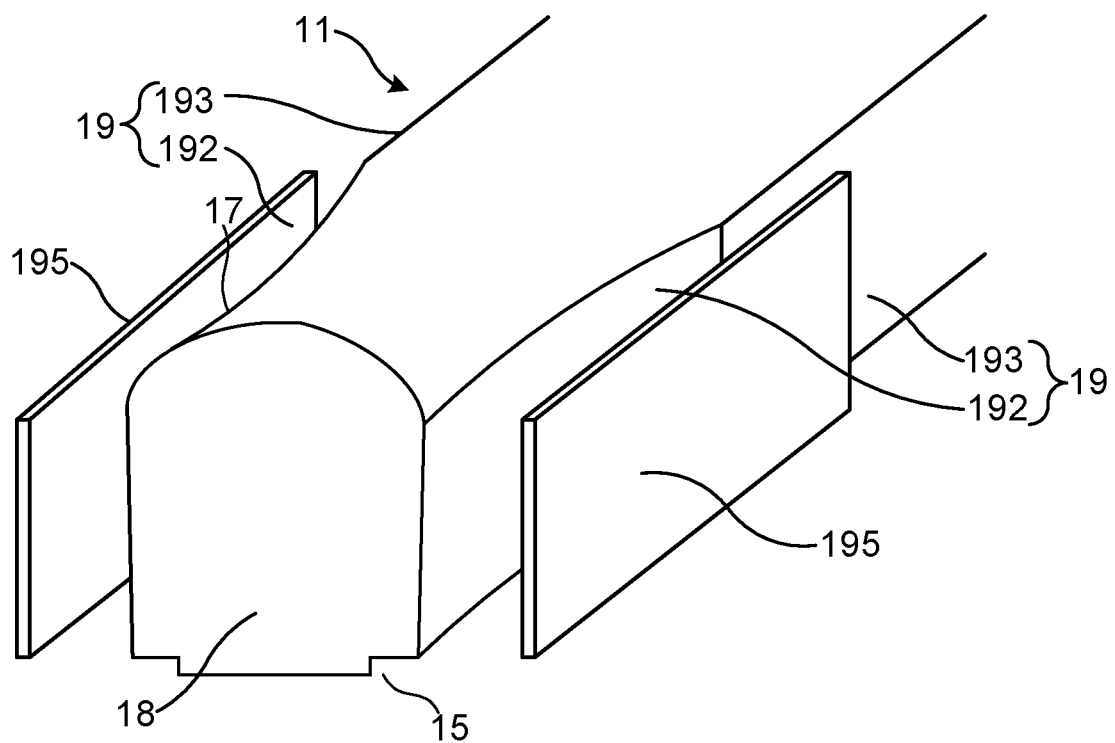
Figure 12B:
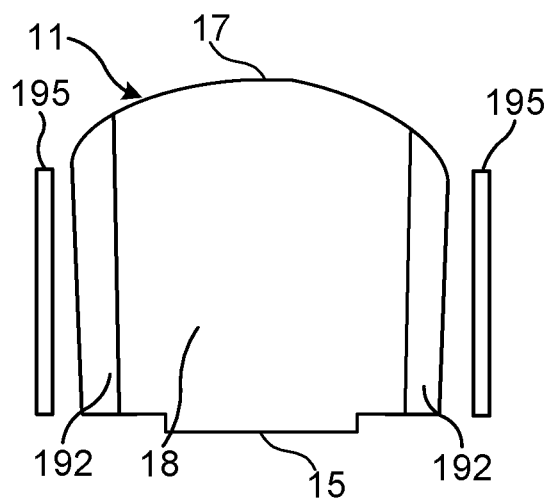

FIG. 12A to FIG. 12C illustrate the light guide 11 and the reflecting plates 195 according to a variation 2, FIG. 12A being a perspective view, FIG. 12B being a front view on the side of the incident surface 18, and FIG. 12C being a plan view on the side of the output surface 17.

In the light guide 11 according to the variation 2, the region 192 in the side face 19 of the light guide 11 close to the incident surface 18 inclined such that the inclination angle increases in the direction away from the incident surface 18, unlike in the light guide 11 according to the foregoing embodiment, in which the region 192 close to the incident surface 18 is linearly inclined in a fixed angle. In other words, the region 192 constituting the sloped portion in the light guide 11 according to the variation 2 is formed in a curved shape.

In this case, the amount of the light directed to the side face of the light guide 11 instead of passing through the incident surface 18 can be adjusted, by varying the inclination angle of the region 192 so as to change the sloped shape of the region 192.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An illuminating device comprising:
a light source; and
a reflector configured to reflect light emitted by the light source; and
a light guide formed of a light-transmissive member extending along an optical axis of light introduced into the light guide, the light guide being configured so as to reflect the light introduced into the light guide in a predetermined direction, wherein
the light guide comprises:
an incident surface provided at least at one of end portions of the light guide in a longitudinal direction, and configured to receive light emitted by the light source;
an output surface constituting a part of an outer peripheral surface of the light guide extending along the optical axis of the light introduced through the incident surface, and configured to output the light introduced through the incident surface; and
a reflecting surface extending along the optical axis so as to oppose the output surface, and including a plurality of reflection patterns that reflect, toward the output surface, the light introduced through the incident surface,
the reflector is disposed so as to oppose a region in the outer peripheral surface other than the incident surface, the output surface, and
the light guide has the outer peripheral surface that includes a sloped portion formed so as to come closer to the reflector in a direction away from the incident surface in the longitudinal direction.

2. The illuminating device according to claim 1,
wherein in the light guide, the sloped portion of the outer peripheral surface is formed within a predetermined distance from the incident surface in the longitudinal direction.

3. The illuminating device according to claim 1,
wherein the sloped portion is formed in a part of the outer peripheral surface so as to recede inwardly of the light guide.

4. The illuminating device according to claim 1,
wherein the outer peripheral surface is formed in a curved shape inclined in an angle increasing in the direction away from the incident surface in the longitudinal direction.

5. The illuminating device according to claim 1,
wherein the light source is opposed to the incident surface so as to emit light into the light guide through the incident surface in the longitudinal direction of the light guide, and to emit light to the reflector.

6. The illuminating device according to claim 5, wherein a size of the light source in a sub scanning direction is larger than a size of the incident surface in the sub scanning direction.

7. An image reading device comprising:
the illuminating device according to claim 5; and
a photodetector that receives light reflected by a source document illuminated by the light emitted through the output surface of the light guide.

\* \* \* \* \*